No. 717,616. PATENTED JAN. 6, 1903.
J. E. PRICE.
WIRE STRETCHER.
APPLICATION FILED AUG. 30, 1902.
NO MODEL. 2 SHEETS—SHEET 1.
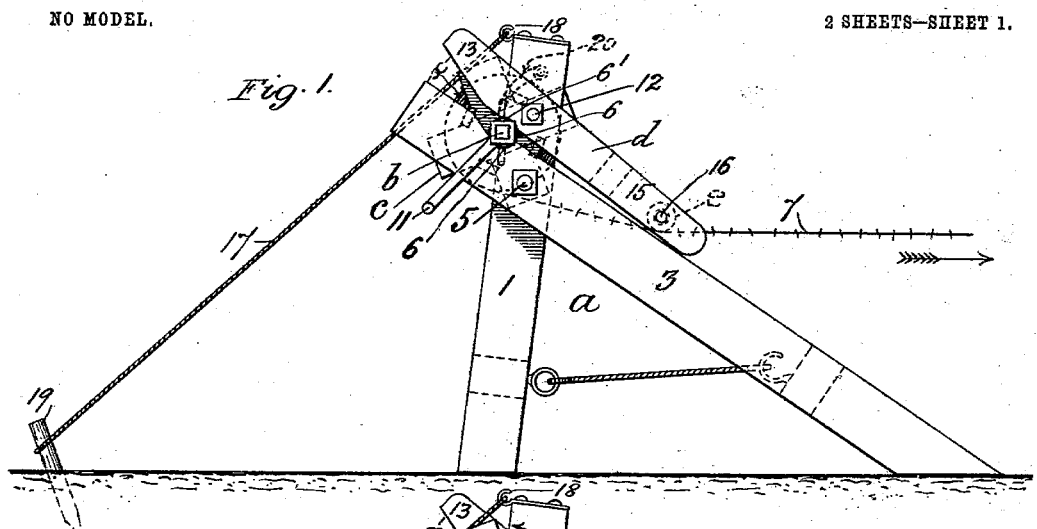
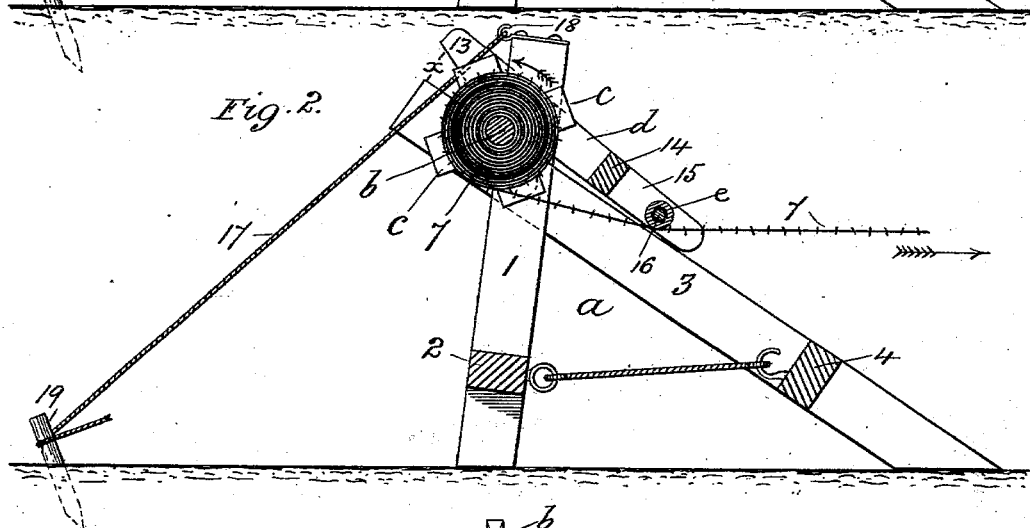
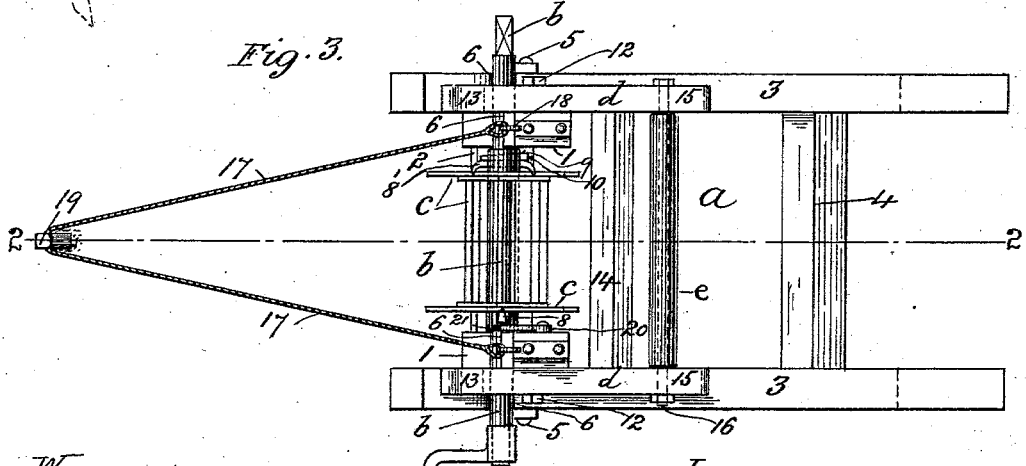
WITNESSES
INVENTOR
James E. Price
By Edward W. Furrell
His Atty

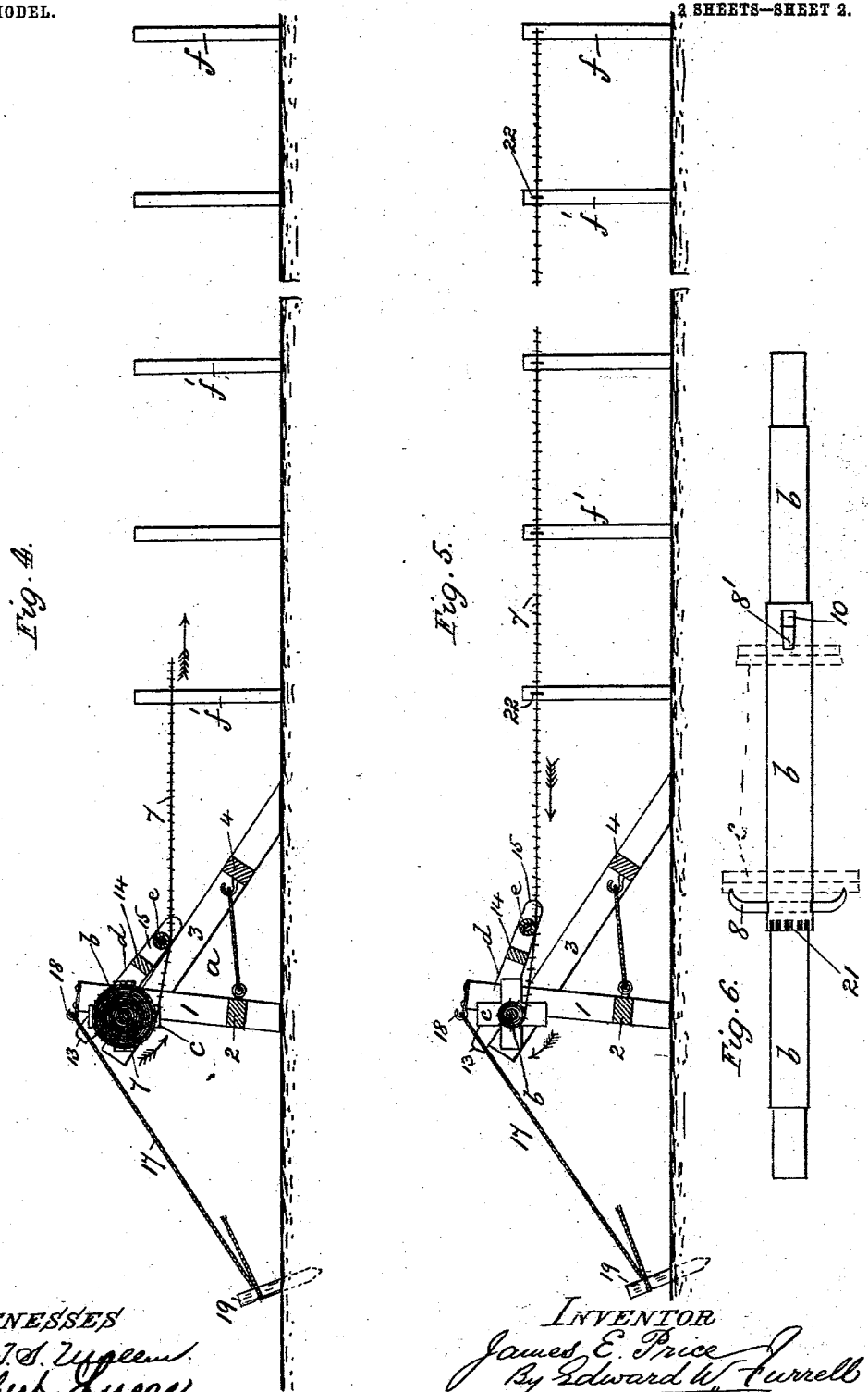

UNITED STATES PATENT OFFICE.

JAMES E. PRICE, OF TEMPLE HILL, ILLINOIS.

WIRE-STRETCHER.

SPECIFICATION forming part of Letters Patent No. 717,616, dated January 6, 1903.

Application filed August 30, 1902. Serial No. 121,670. (No model.)

*To all whom it may concern:*

Be it known that I, JAMES E. PRICE, a citizen of the United States, residing at Temple Hill, in the county of Pope and State of Illinois, have invented a new and useful Improvement in Wire-Stretchers, of which the following is a specification.

My invention relates to a wire-stretcher specially designed for stretching barb-wire fencing, and has for its object to enable the entire length or any desired part of a bale of barb-wire to be strung, stretched, and fastened to the fence-posts at one operation or to be removed from a fence and rebaled.

It consists in a novel construction and arrangement of the wire-stretcher frame for facilitating the mounting thereon of the bale with its spindle and for convenience of carriage combined with a wire guiding or straightening device, as hereinafter described and claimed, reference being had to the accompanying drawings, forming part of this specification, whereon—

Figure 1 is a side elevation of my improved wire-stretcher, showing a bale of barb-wire in position thereon for unwinding; Fig. 2, a longitudinal vertical section thereof on line 2 2 in Fig. 3, and Fig. 3 a top plan of the same. Fig. 4 is a view of the wire-stretcher corresponding to Fig. 2, showing the fence-posts to which the wire is to be attached; Fig. 5, a corresponding view to Fig. 4, showing the wire unwound from the bale and fastened to the posts; and Fig. 6, a detail view, to enlarged scale, of the bale-spindle and its appendages forming parts of my invention.

Like letters and numerals of reference denote like parts in all the figures.

$a$ represents a frame composed, preferably, of two opposite and parallel side posts 1, which are secured together by a cross-piece 2, and of two opposite inclined bars 3, secured together by a cross-piece 4. The bars 3 are pivoted, preferably, to the outside faces of the posts 1, respectively, by a bolt or pin 5, whereby the posts 1 and bars 3 can be opened outward from each other for resting firmly on the ground, as shown, or folded together in the same plane for convenience of transportation.

In the upper edges of the bars 3 and front edges of the posts 1, adjacent to their hinges 5, are formed transverse grooves 6, which are alined to each other and adapted to form bearings for the journaled end portions of a spindle $b$, on which between its bearings 6 is mounted the bale or spool $c$ of barb-wire 7. The bale $c$ is removably fixed to the spindle $b$, preferably by dogs 8 8', one of which, 8, is fixed to the spindle $b$ and engages in one end of the bale $c$, while the other dog, 8', passes loosely through a slot 9 therefor in the spindle $b$ and is forced into engagement with the other end of the bale $c$ by a wedge 10, which passess through the slot 9 behind the dog 8', so that on driving home the wedge 10 the dog 8' is moved toward the fixed dog 8 and the bale $c$ thereby gripped by the dogs 8 8' and held firmly to the spindle $b$, which is provided with a handle 11 for rotating the spindle $b$.

To the outer side of each post 1, immediately over the upper inclined edge of the corresponding bar 3, is pivoted by a pin or bolt 12 a lever $d$ of the first order, having a groove 6' in the lower edge of its front arm 13, corresponding to and forming conjointly with the grooves 6 the upper portion of the bearing to the spindle $b$, the said edge of the lever $d$ tapering upward from the groove 6', or thereabout, to the outer end of the lever $d$, so as to normally form a gap or passage-way $x$ thereat, through which the spindle $b$ is inserted and mounted in the bearings 6 6'.

The levers $d$ are secured to each other by a cross-piece 14, and between the rear arms 15 of the levers $d$ at a suitable distance from their pivots 12 is mounted a roller $e$, having its axis 16 in the arms 15.

In operation the spindle $b$ is first passed through the central holes of the bale or spool $c$, around which the wire 7 is wound, and the bale $c$ then fixed to the spindle $b$ by the dogs 8 8' and wedge 10. The spindle $b$, with the bale $c$, is then passed through the gaps $x$ and mounted in the bearings 6 of the frame $a$, which is then placed in position at a corner or other desired part of the fence to be wired and held thereat by a guy-rope 17, which is hitched at the ends to hooks 18 at the upper ends of the posts 1 and thence passed around a stake 19, driven into the ground. The barb-wire 7 is then unwound from the bale $c$, as indicated by the arrows in Figs. 1 and 4, and bearing against the roller $e$ on its under side raises the arms 15 and lowers the arms 13 of the levers $d$ into the position seen in Fig. 5, or so as to close the gaps $x$, and thereby confine the spindle $b$ to its bearings 6 6', the roller $e$ at the same time operating as a guide or straightener in straightening and preventing kinking of the wire 7. When the wire 7 has been sufficiently unwound and its free end secured to the farthest post $f$, the spindle $b$ is rotated by its handle 11 in an opposite direction, as indicated by the arrow in Fig. 5, whereby the bale $c$ is correspondingly turned in the same direction and stretches the wire 7 for its entire length between the post $f$ and the frame $a$, the spindle $b$ being locked in this position by a hook or pawl 20, which falls into engagement with one of a series of notches 21 in the circumference of the spindle $b$. The wire 7 is then fixed by staples 22 to the intermediate posts $f'$, when the wire 7 is cut from the bale $c$ and the operation repeated for the other strands of the fence.

If desired, the spindle $b$ may be used without the bale or spool $c$ for removal of wire from a fence, in which case the wire after its removal from the posts is hitched to the fixed dog 8 and wound directly onto the spindle $b$, which forms the bale, for future use.

What I claim as my invention, and desire to secure by Letters Patent, is—

In a wire-stretcher, the combination of a frame made in two parts pivoted to each other and adapted to be folded together in the same plane, two opposite bearings formed in the sides respectively of the said parts and alined to each other in the "unfolded" position of the frame, a spindle having the bale of wire thereon and adapted to be rotated in the said bearings, levers of the first order pivoted to the sides respectively of one of the said parts, one arm of each of the levers being adapted to close the opening to the said bearing adjacent to the said arm, a roller pivoted to and between the other arms of the levers, and means for holding the frame in position, substantially as described.

In testimony whereof I have signed my name to this specification in the presence of two subscribing witnesses.

JAMES E. PRICE.

Witnesses:
W. H. WHITESIDE,
A. J. NESSELRADT.